T. T. FURLONG.
Whiffletrees.

No. 163,862.

Patented June 1, 1875.

WITNESSES
Frederick A. Herring
Joseph S. Williams

INVENTOR
Thomas P. Furlong
By Gridley & Warner
Attys

UNITED STATES PATENT OFFICE

THOMAS T. FURLONG, OF CHICAGO, ILLINOIS.

IMPROVEMENT IN WHIFFLETREES.

Specification forming part of Letters Patent No. 163,862, dated June 1, 1875; application filed October 31, 1874.

*To all whom it may concern:*

Be it known that I, THOMAS T. FURLONG, of Chicago, in the county of Cook and State of Illinois, have invented a new, useful, and Improved Whiffletree, of which the following is a full, clear, and exact description, which will enable others skilled in the art to which my invention appertains to make and use the same, reference being had to the accompanying drawing forming a part hereof, and in which—

Figure 1:
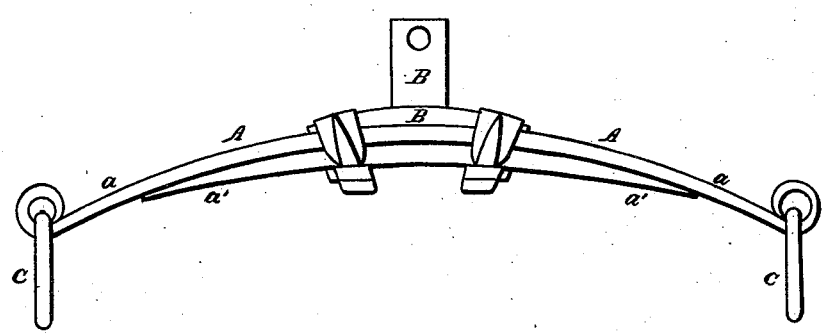
Figure 2:
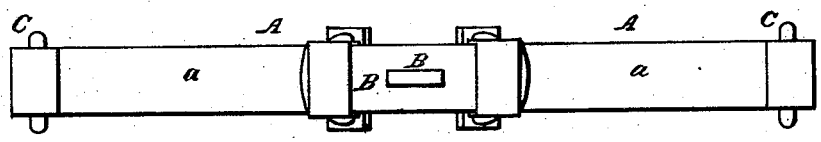

Figure 1 is a top or plan view of my improved whiffletree arranged in the position it occupies while being used, and Fig. 2 a rear elevation thereof.

Like letters of reference indicate like parts.

In the drawing, A represents a half elliptic spring, made preferably of separate leaves of steel $a$ $a'$, each differing from the other in length, the rear leaf $a$ being the longest, and the front one the shortest, and all clasped or locked together in the usual manner near the center, as shown. B is a perforated lug or draw-bar, rigidly attached to the central part of rear leaf of the spring. C C are links or rings arranged in the ends of the longest leaf, the latter being preferably bent, as shown, to receive the said rings or links.

The example shown is adapted for street-cars intended to be drawn by only one horse. The perforation or hole in the piece B receives the bolt usually employed to attach the ordinary whiffletrees to the cars. The traces are arranged in the rings at the end of the whiffletree. My improved device may also be applied to other vehicles, and two of the whiffletrees may be used in connection with an evener when two horses are employed.

I am aware that elliptic springs have heretofore been employed in the construction of whiffletrees, but when half elliptic springs have been used for this purpose, they have been so constructed and arranged, so far as I am aware, that the draft has been in such a direction as to tend to straighten the springs, and I do not claim such; but it will be perceived from the foregoing description, and from reference to the drawing, that my improved device is so constructed and arranged that the draft will be toward the center of the curves in which the leaves of the springs lie.

The advantages of the latter construction and arrangement of the parts constituting the whiffletree are, that the device, as a whole, is equally as strong and more flexible than when provisions are made for having the draft in the opposite direction; more room is also left for the movement of the horse's legs.

Having thus described my invention, what I claim as new, and desire to secure by Letters Patent, is—

As a new article of manufacture, a whiffletree consisting of a half elliptic spring, made of flexible leaves, differing from each other in length and bound together at or near their centers, one or more of the shorter leaves being within the curve of the longest one, and the said spring being provided with a draw-bar or lug, and constructed at the ends to receive the traces, substantially as specified.

THOMAS T. FURLONG.

Witnesses:
F. F. WARNER,
N. C. GRIDLEY.